United States Patent [19]

Von Ohain et al.

[11] 3,785,593

[45] Jan. 15, 1974

[54] AIRCRAFT PROPULSION SYSTEM

[75] Inventors: Hans J. P. Von Ohain; Roscoe H. Mills; Charles A. Scolatti, all of Dayton, Ohio

[73] Assignee: The United States of America as represented by the Secretary of the Air Force, Washington, D.C.

[22] Filed: Sept. 10, 1971

[21] Appl. No.: 179,521

[52] U.S. Cl. ........... 244/12 R, 244/40 R, 244/42 C, 244/42 CD, 244/42 DA
[51] Int. Cl. .......................................... B64c 29/04
[58] Field of Search ............ 244/12 R, 12 C, 12 W, 244/12 D, 40 R, 42 R, 42 C, 42 CD, 42 CB, 42 CC, 42 CF, 42 D, 42 DA, 23 R, 23 A, 23 B, 23 D, 35 R, 34, 45 R, 13, 15; 415/DIG. 1; 239/265.17

[56] References Cited
UNITED STATES PATENTS

| 1,879,717 | 9/1932 | Sikorsky | 244/40 R |
| 2,453,721 | 11/1948 | Mercier | 244/15 |
| 2,469,902 | 5/1949 | Stalker | 244/40 R X |
| 2,833,492 | 5/1958 | Fowler | 244/40 R |
| 2,910,254 | 10/1959 | Razak | 244/45 R X |
| 2,916,230 | 12/1959 | Nial | 244/35 R X |
| 3,058,695 | 10/1962 | Simonis | 415/DIG. 1 X |
| 3,525,474 | 8/1970 | Von Ohain et al. | 239/265.17 |

Primary Examiner—Milton Buchler
Assistant Examiner—Barry L. Kelmachter
Attorney—Harry A. Herbert, Jr. et al.

[57] ABSTRACT

The invention relates to a propulsion system particularly adapted to VTOL and STOL type of aircraft and in which a main wing has an auxiliary wing arranged either above or below in spaced biplane relation with the space between the wings, in combination with suitable end plates, forming a rectangular propulsion duct extending spanwise on each side of a central fuselage. A gas turbine driving an air compressor has the compressed air therefrom delivered through a conduit formed in one of the wings from whence it passes to a series of injection nozzles which inject air into the duct inlet to entrain and mix with atmospheric air drawn into the inlet and which expands in a diffuser portion of the duct to generate an augmented propulsive thrust. The nozzles are housed in streamlined struts or housings extending vertically between the wings and transverse to the duct. One of the wings is provided with an adjustable trailing edge flap for varying the discharge area of the propulsive duct diffuser and the other wing is provided with a flap provided with nozzles at its leading edge and adapted to discharge over the suction surface of the flap and when the flap is depressed downward to cause additional downward deflection of the propulsive duct discharge by "Coanda" effect.

6 Claims, 7 Drawing Figures

PATENTED JAN 15 1974

INVENTORS
HANS J. P. VON OHAIN
ROSCOE H. MILLS
CHARLES A. SCOLATTI
BY Harry G. Herbert Jr.
Raymond J. Crowley
ATTORNEYS INVENTORS
HANS J. P. VON OHAIN
ROSCOE H. MILLS
CHARLES A. SCOLATTI
BY Harry C. Herbert, Jr.
Raymond J. Browley
ATTORNEYS

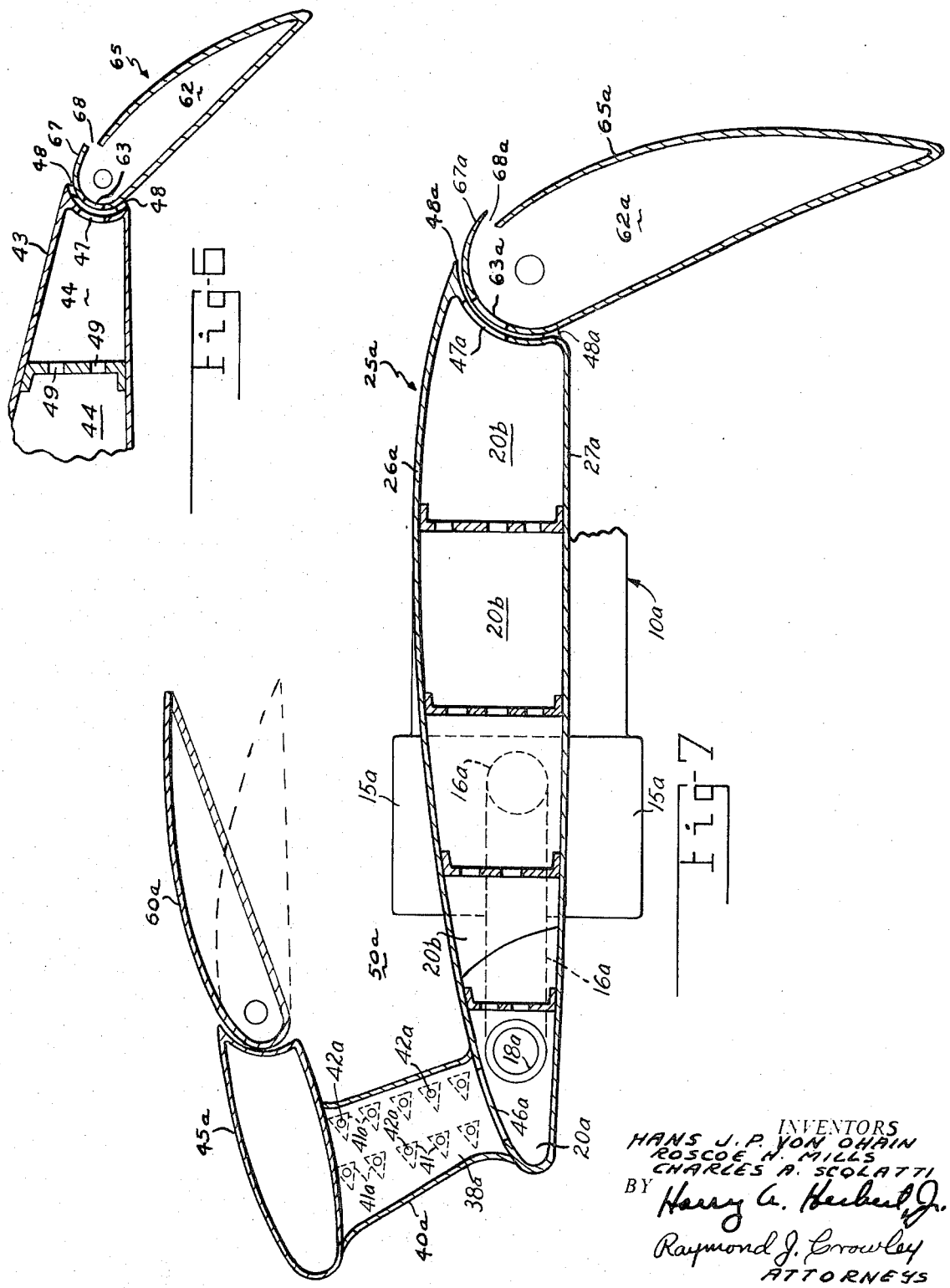

AIRCRAFT PROPULSION SYSTEM

CROSS REFERENCE TO RELATED PATENT

In our application Ser. No. 782,184 which was filed on the 9th day of December 1968 for JET PUMP OR THRUST AUGMENTER now U.S. Pat. No. 3,525,474 issued on the 25th day of August 1970, we have disclosed improvements in propulsive ducts in which a thrust augmentation ratio of substantially three to one can be achieved. The present invention relates to adapting the improved propulsive duct specifically for use with vertical take off and landing aircraft (VTOL) and slow take off and landing aircraft (STOL).

BACKGROUND OF THE INVENTION

1. Field of the Invention

THe invention relates in general to aircraft propulsion devices known as thrust augmenters, in which primary jets of air are mixed in a duct with an induced secondary flow of air to increase the total mass flow and hence the thrust. The invention specifically concerns the arrangement of aircraft power plant and wing components to form, in addition to their normal function as airfoils, a thrust augmenting duct.

2. Descriptiion of the Prior Art

The use of ejector apparatus for aircraft propulsion dates back to World War I. The closest prior art appears to be an article by Paul Guienne entitled "Ejectors or the Ejector Wing, Applied to V/STOL Aircraft," appearing in JARBUCH 1960 der Wissenschaftlechen Gesellschaft fuer Luftfahrt, pages 76 through 81 and U. S. Pat. No. 3,332,644 dated July 25, 1967. Neither of these references disclose the particular combination of aircraft and propulsion duct forming the present invention.

SUMMARY OF THE INVENTION

The invention is primarily concerned with applying the principles of the thrust augmenter to an aircraft wing structure to obtain an improved craft capable of VTOL or STOL operation. A main wing of airfoil cross section cooperates with an auxiliary wing of airfoil cross section arranged in biplane relation with the main wing to form therebetween a thrust augmenting duct. Air under pressure supplied by the power plant is injected by a large number of nozzles into the inlet of the thrust augmenting or propulsion duct. The primary jet flow induces a high mass secondary flow into the duct causing a forced circulation about the airfoil sections and producing lift. The pressure rise of the air diffused from the duct is controlled by an adjustable flap on one of the wings while a similar flap on the other wing when depressed has additional jets of primary air blown over its suction surface accelerating the boundary layer thereon and deflecting the thrust augmenter stream downward to increase the vertical lift component.

BRIEF DESCRIPTION OF THE INVENTION

In accordance with the invention, an aircraft is provided with a gas turbine engine which drives a conventional axial flow air compressor or fan, either a separate unit or forming an integral part of the gas turbine complex. Compressed air from the compressor is led through a conduit which connects to a chamber in a hollow wing structure which serves as a distribution manifold. The aircraft is provided with a main wing or supporting airfoil surface and an auxiliary wing or airfoil surface arranged either above or below the main surface in biplane configuration. The space between the main and auxiliary wings is employed as a rectangular propulsion duct having the aircraft fuselage forming the inner end wall and suitable vertical end plates forming the outer end walls of each duct portion. A plurality of injection nozzles are connected to the air distribution manifold in the wing and inject air jets into the inlet portion of the propulsive duct. The primary air, by virtue of its velocity, drops in pressure and induces a secondary flow of ambient atmosphere into the duct inlet and to mix with the primary air jets. The duct is provided with a mixing section downstream from the inlet and a diffuser section aft of the mixing section. One of the airfoil surfaces is provided with a flap along its trailing edge which is movable to control the exit area of the diffuser section of the propulsive duct. The other airfoil surface is provided with a flap which has air injection nozzles adjacent its leading edge. The injection nozzles are arranged to receive air under pressure from the distribution manifold in the wing and serve to blow off and accelerate the boundary layer of the suction surface of the flap. When the flap is deflected downward, the flow thereover by virtue of the so-called "Coanda" effect deflects the main discharge of the fluid stream from the propulsive duct increasing the vertical thrust component or lift.

BRIEF DESCRIPTION OF THE DRAWINGS

FIG. 6 is an enlarged fragmentary sectional view of FIG. 3 illustrating in detail the main flap fully deflected, and FIG. 7 is a view similar to FIG. 3 of a modified arrangement of the propulsive duct in which the auxiliary airfoil is positioned above the main wing.

DETAILED DESCRIPTION OF THE INVENTION

Figure 1:
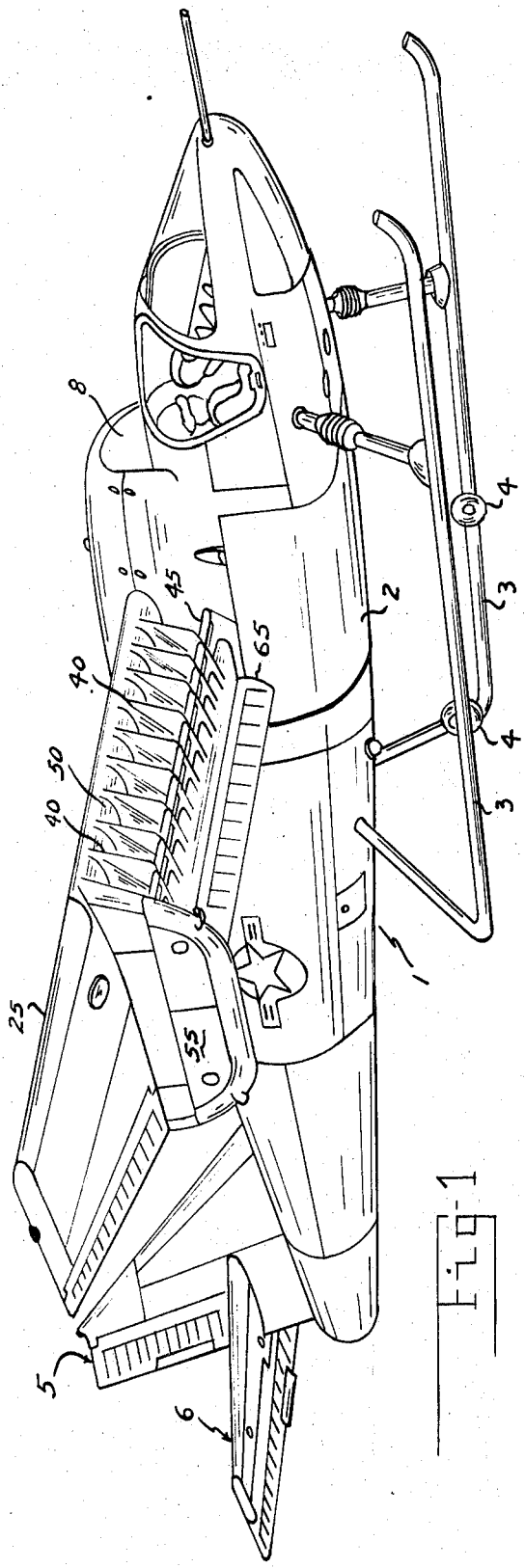
FIG. 1 is an isometric view of an aircraft incorporating a novel thrust augmenting propulsion duct in accordance with the invention.

With reference to FIG. 1, the reference numeral 1 generally indicates an aircraft incorporating the features of the invention. The aircraft has a conventional fuselage 2 provided with a skid type landing gear 3 equipped with wheels 4. The fuselage 2 is provided with conventional vertical tail surfaces 5 and horizontal tail surfaces 6 and has an inlet 8 to supply air to the power plant. Where the aircraft is intended for vertical take off, supplemental jet reaction type controls can be employed for creating control movements about the center of gravity. Since such control jets are well known in the art and form no part of the invention, the same have not been illustrated.

Figure 2:
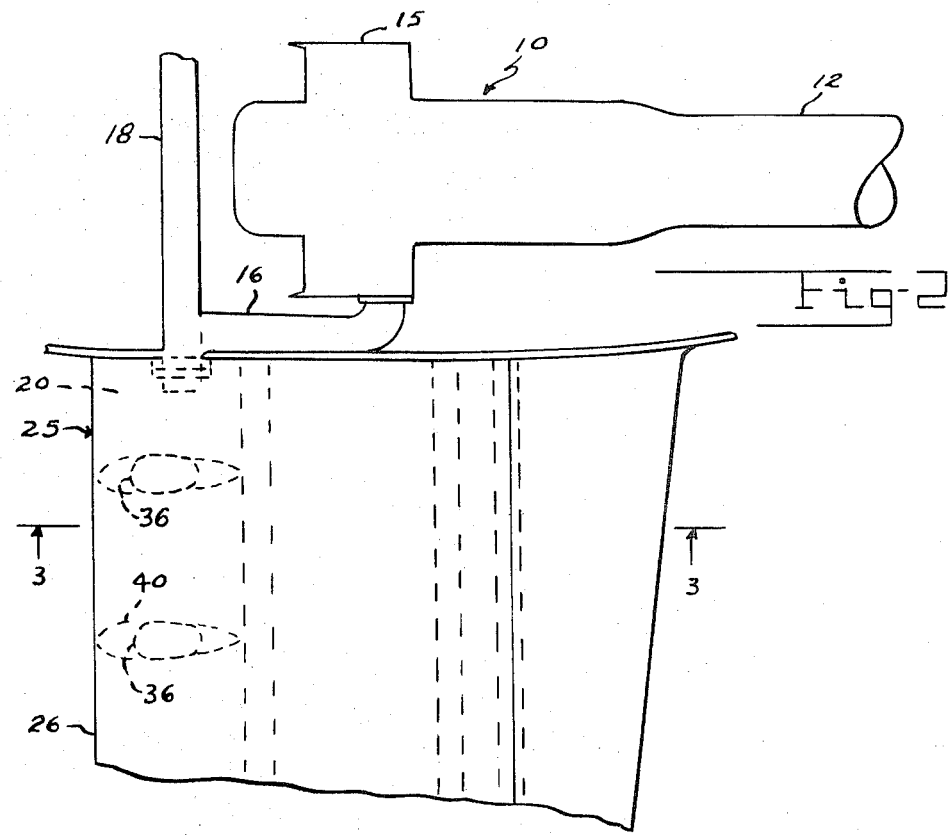
FIG. 2 is a schematic view illustrating the power section of the aircraft of FIG. 1.

The aircraft 1 of FIG. 1 is provided with a conventional gas turbine power plant, as generally indicated in FIG. 2 by reference numeral 10, and which discharges a jet exhaust through a conventional tail pipe 12. The gas turbine 10 is adapted to drive a conventional axial flow or other type of vaned compressor 15 which, however, can be built, as shown, as an integral part of the gas turbine, or the compressed air may be bled from some of the gas turbine compressor stages, as is well known in the art.

The compressed air output of compressor 15 is taken by an output conduit 16 into a laterally extending conduit 18 extending on each side of the fuselage 2 and terminating in a manifold structure 20 formed as an integral part of the wing structure.

Figure 3:
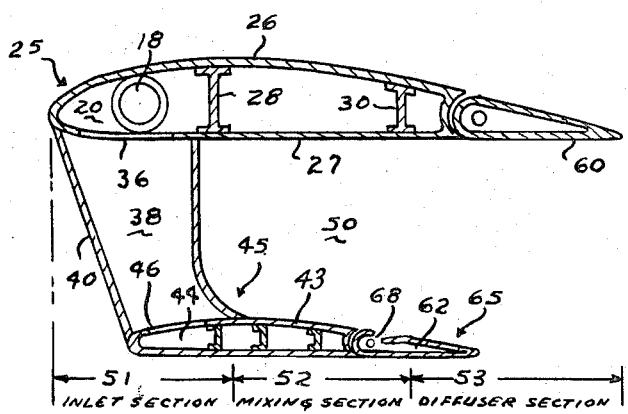
FIG. 3 is a cross-sectional view taken on line 3—3 of FIG. 2 illustrating the propulsive duct components of the aircraft of FIG. 1.

As seen in FIG. 1, the aircraft 1 is provided with a main supporting wing 25 of airfoil cross section. The wing 25, as seen in FIG. 3, is preferably constructed of lightweight metal alloy with suction surface skin 26 and pressure surface skin 27 with spanwise extending main spars 28 and 30. The hollow nose section of the wing 25 forward of the spar 28 forms the conduit or manifold space 20 and conducts air under pressure from the conduit 18. The manifold space 20 connects by means of apertures 36 through the skin 27 with the hollow interior 38 of a plurality of streamlined struts or fairings 40 which extend downward normal to the pressure surface skin 27 and are secured at their lower ends to the suction surface 43 of an auxiliary wing generally indicated at 45, FIGS. 1 and 3. The struts or fairings 40 are arranged in parallel relation and spaced apart spanwise as indicated in FIG. 1.

Figure 5:
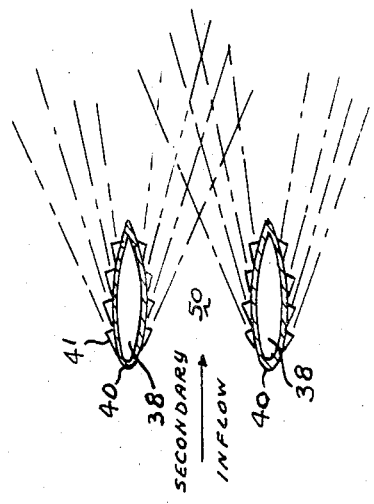
FIG. 5 is a fragmentary sectional view illustrating the primary injection nozzles and the flow pattern thereof.
Figure 4:
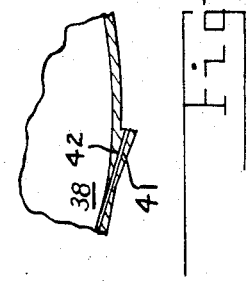
FIG. 4 is a fragmentary sectional view illustrating details of a typical primary flow injection nozzle.

The interior 38 of the streamlined fairings 40 each communicate with a plurality of nozzles 41 positioned in parallel vertical rows over the major external surface area of each of the fairings 40 with the nozzles of one row staggered with respect to an adjacent row. The nozzles 41 are streamlined where exposed to the airstream and as seen in FIG. 4 are provided with internal drilled passages 42 of the order of one-eighth inch to one-fourth inch communicating with the interior space 38 of the streamlined housings 40. The drilled passages 42 inject jets of primary air of small diameter but high velocity into the inlet section 51 of the duct 50 (note FIG. 3). The injection spray pattern is governed by the orientation of the drilled passages 42 of the nozzles 41 and are arranged each to have a jet axis inclined at an angle to the axis of the inlet flow of secondary air. The primary jet spray pattern is preferably of the type indicated by dotted lines in FIG. 5 which insures adequate mixing of the primary jet flow throughout the spanwise cross section of the duct 50, with the induced secondary flow in the shortest distance with a maximum transfer of energy from the primary jets to the secondary flow. The space 50 is utilized as a propulsion duct and is rectangular in shape and has a converging inlet section 51, a mixing section 52 and a divergent diffuser section 53. As seen in FIG. 1, the fuselage 2 forms an inner end wall for each of the ducts and end plates 55 form the outer end walls of the propulsive ducts 50.

As seen in FIG. 3, the main wing 25 is provided with flap 60 of approximately one-third the chord of the main wing which can be elevated upward to a maximum position, as indicated in dotted lines in FIG. 3. Raising the flap 60 increases the exit area of the propulsive duct 50 and hence serves as a means for controlling the magnitude of the thrust augmentation depending on the flight condition.

The auxiliary wing 45 is constructed of sheet metal and, as seen in FIG. 3, has its hollow interior 44 connected to the hollow interior 38 of the streamlined fairings 40 by means of suitable ports 46. Air under pressure may flow from the conduits 18 and 20 through the interior chambers 38 of the fairings 40 into the interior chamber 44 of the auxiliary wing 45 by means of the ports 46. Air under pressure may flow throughout the interior chamber 44 of the auxiliary wing by means of suitble apertures or the like in the spar webs for example as illustrated at 49 in FIG. 6. Air within the chamber 44 may flow by means of ports 47 in the rear wall of the auxiliary wing 45 past seals 48 into ports 63 leading to the hollow interior 62 of a flap 65 suitably pivotally supported from the aft portion of the auxiliary wing 45. The nose portion of the flap 65 is adapted to sealingly engage the seals 48 to prevent leakage of compressed air in the gap between the flap and the rear wall of the wing structure but allow free flow communication through ports 47 and 63. The upper surface of the flap 65 is offset adjacent its leading edge as indicated at 67, FIG. 6, to form an orifice 68 extending spanwise across the flap 65. The orifice 68 of flap 65 serves as a means for blowing air in jets over the upper surface of the flap. The secondary injection of air when the flap 65 is moved downward to its maximum extent (see FIG. 6) causes a reduction in pressure along the upper surface of the flap and by the socalled Coanda effect causes the flow to adhere to the flap and causing the main flow to be turned through a large angle without flow separation. This permits the vertical component of the augmented thrust or lift to be considerably increased. By means of conversion of the gas turbine power into a large mass flow of air by virtue of the thrust augmenting capability of the propulsive duct 50 in conjunction with the flaps 45 and 65, vertical lift in excess of the weight of the aircraft can be developed with a higher propulsive efficiency than in machines where jet engine exhaust is directly employed to lift the aircraft.

As the aircraft of FIG. 1 acquires forward velocity, the flap 65 can be elevated to longitudinal position and the duct 50 will still serve as a means for propulsion of the aircraft with good efficiency up to velocities of the order of 300 miles per hour. As ram effect replaces the induction of inlet air by reduction of pressure caused by the primary injection jets, the difference between the primary jet velocity and inlet velocity decreases. The mixing losses decrease and good propulsion efficiency is available in the normal flight range.

In the arrangement of the elements of the invention as seen in FIG. 7, the parts corresponding to the same elements in FIGS. 1 through 6 are identified by the same reference numeral with the subscript "*a*." In the assembly of FIG. 7 it will be understood that the aircraft of FIG. 1 is unchanged except that the auxiliary wing is positioned above instead of below the main wing but still in biplane relation. Further the positions and respective functions of the flaps are interchanged. In FIG. 7, the main wing 25*a* has the auxiliary wing 45*a* positioned in vertically spaced biplane relation thereabove. The vertical space between the auxiliary wing 45*a* and the main wing 25*a* becomes the propulsive duct 50*a* similar in function to the duct 50 of the form of the invention as disclosed in FIGS. 1 through 6. The duct 50*a* however overlies the suction surface of the main wing 25*a* and the position and function of the flaps 60 and 65 of the embodiment of FIGS. 1 thorugh 6 are reversed, the flap 60a hinged to the auxiliary wing 45a being employed for varying the diffuser action of the duct 50a and flap 65a serving as the Coanda effect flap.

It will be understood that the wing assembly of FIG. 7 will be employed with a power plant such as turbine engine 10a and compressor 15a identical to the corresponding elements disclosed in FIG. 2 and in which the output of the compressor 15a will be delivered by conduits 16a and 18a to the hollow interior 20a of the nose section of the main wing 25a. Air under pressure delivered to the nose section 20a is free to flow from chamber 20a to the remaining interior chambers of the wing each indicated by the reference numeral 20b because of the perforated spar webs and thus can flow through the port 47a in the rear wall of the wing structure. Air discharged from the port 47a can enter the hollow interior 62a of the Coanda effect flap 65a by means of a port 63a adapted to register with port 47a when the flap 65a is deflected. Seals 48a reduce leakage through the clearance space between the nose of the flap and the rear wall of the wing structure. Air under pressure confined to the hollow interior 62a of the flap 65a is adapted to be discharged tangentially from the slot opening 68a and in flowing over the upper surface of the flap accelerates the boundary layer and reduces the pressure above the flap causing the flow thereabove to follow the flap and increasing the net deflection downward of the flow with corresponding increase in the lift reaction.

The air delivered under pressure from the conduit 18a to the interior wing nose section chamber 20a can also flow by way of a port 46a in the wing suction surface 26a to the interior chamber 38a of each of a plurality of streamlined struts or fairings 40a. The struts or fairings 40a are arranged vertically in spanwise spaced relation similar to the corresponding fairings 40 of FIG. 1. The fairings 40a serve to support the auxiliary wing 45a in vertically spaced, or biplane relation, to the main wing 45a. Air under pressure within the interior chambers 38a of each fairing 40a can issue in jets from drilled passages 42a formed in nozzles 41a arranged in staggered rows on the exterior surface of the fairings 40a. The nozzles 41a shown in dotted outline in FIG. 7 serve to discharge high speed jets of air into a substantial part of the spanwise cross section of the inlet section of the duct 50a to cause a mixing with ambient air and by ejector effect to induce ambient air flow into the duct 50a. The inflow receives energy from the jets with an increased mass flow from the duct to augment the thrust which would be developed by the jets alone in the same manner as in the arrangement of FIG. 1. The flow discharged by the duct 50a over the suction surface 26a of the airfoil increases the airfoil lift by increasing the circulation thereabout which is further accentuated by the lift developed by virtue of the Coanda effect.

We claim:

1. In an aircraft propulsive system having a power source, a compressor driven by the power source, a main supporting airfoil surface having conduit means therein connected to said compressor, an auxiliary airfoil surface arranged in spanwise extending spaced biplane relation to said main airfoil surface, end plates extending from the outer ends of said auxiliary airfoil surface to the main supporting airfoil surface, the space between said surfaces forming a rectangular spanwise extending propulsive duct, said duct having an inlet open to the ambient atmosphere, a mixing section and a diffuser section adapted to discharge to the atmosphere, a plurality of nozzles each connected to said conduit means and adapted to discharge air into said duct inlet section substantially throughout the spanwise cross section thereof to mix with air flowing into said inlet section from the ambient atmosphere and to produce thrust in expanding through said duct diffuser section and a flap on the aft portion of one of said airfoil surfaces and adapted to be adjusted to vary the propulsion duct diffuser exit area.

2. The structure as claimed in claim 1, in which a spanwise extending flap is provided on the other of said airfoils, both of said flaps when deflected downward directing the discharge flow from said duct in a downward direction and said second named flap having nozzle means on its suction side adjacent the flap leading edge, a connection between said flap nozzle means and said primary source of air under pressure, said flap nozzle means being effective when both flaps are deflected downward to remove the boundary layer from the suction side of the second named flap and by Coanda effect to additionally deflect the flow discharge from said duct.

3. The structure as claimed in claim 1 in which the main supporting airfoil surface is provided with a trailing edge flap, said flap having nozzle means adjacent its leading edge, a connection between said nozzle means and the conduit means connected to the compressor, said nozzle means directing jets of air over the suction surface of said main airfoil surface flap and when said flap is deflected downward to increase the downward deflection of the main discharge from said propulsion duct by Coanda effect.

4. The structure as claimed in claim 3, in which said auxiliary airfoil is positioned above the main supporting airfoil surface adjacent the leading edge thereof, said auxiliary airfoil having a chord less than one-half the chord of said main supporting airfoil surface, the thrust augmentation increase being developed by deflection of the airflow over the suction side of the main supporting airfoil surface.

5. A lifting and propulsion means for aircraft including at least one pair of spanwise extending airfoils positioned in spaced biplane arrangement to form a propulsion duct therebetween, said duct having a convergent inlet section communicating with the ambient atmosphere, a mixing section and a diffuser section, one of said airfoils having a portion thereof serving as an internal conduit and adapted to be connected to a primary source of air under pressure, a plurality of spanwise spaced hollow streamlined fairings extending across said duct and each connected to said internal conduit, each of said streamlined fairings having external nozzle means over the exterior surface thereof for injecting primary air into the inlet portion of said duct substantially throughout the spanwise cross section thereof and to induce a secondary flow of air into said duct through the inlet thereof to mix with the primary air in said propulsion duct mixing section and to expand in said diffuser section to create a propulsive thrust and a spanwise extending flap on one of said airfoils adjustment thereof varying the exit area of the diffuser section of said duct.

6. In an aircraft propulsion system having a power source, a compressor driven by the power source, a main supporting airfoil surface, an auxiliary spanwise extending airfoil surface arranged in spaced biplane relation to said main airfoil surface, vertical end plates extending from the tips of said auxiliary airfoil surface to said main airfoil surface, the space between said surfaces forming a rectangular spanwise extending propulsion duct, said duct having an inlet open to the ambient atmosphere, a mixing section and a diffuser section adapted to discharge to the ambient atmosphere, means connecting the hollow interior of one of said airfoil surfaces to said compressor to receive air under pressure therefrom, a plurality of streamlined fairings extending in spaced relation across said duct normal to the plane of said airfoil surface, the interior of each of said fairings being connected to the interior of the airfoil surface receiving air under pressure from the compressor and discharge nozzle means over the surface of each of said fairings to discharge primary jets of air substantially over the length of the fairing into the propulsion duct inlet substantially throughout the spanwise cross section thereof, a flap on the trailing edge of said auxiliary airfoil surface and extending over the span of said auxiliary airfoil surface and adjustable to vary the exit area of the propulsion duct, a spanwise extending flap on said main supporting airfoil surface, nozzles adjacent the leading edge of said last named flap, means connecting said flap nozzles to the interior of the airfoil surface carrying air under pressure from the compressor whereby said flap nozzles discharge air over the suction surface of said main airfoil surface flap so that the flap when deflected downward will induce by a Coanda effect an additional deflection downward of the airflow from said propulsive duct.

* * * * *